United States Patent Office 2,849,516
Patented Aug. 26, 1958

2,849,516

SHAPED RUBBER COMPOSITIONS CONTAINING PETROLEUM CRESYLIC ACID MONOSULFIDES

Harry E. Albert, Akron, Ohio, and Lloyd O. Bentz, Lancaster, Pa., assignors to The Firestone Tire & Rubber Company, Akron, Ohio, a corporation of Ohio No Drawing. Application December 24, 1953
Serial No. 400,342

2 Claims. (Cl. 260—810)

This invention relates to the use of cresylic acid sulfides in natural rubber compositions to prevent attack of the rubber by ozone. Sulfides of coal tar cresylic acids are not particularly effective, and disclor white stocks. The cresylic acid sulfides to which this invention relates are monosulfides of cresylic acids derived from petroleum, and they are sulfides of only those cresylic acids which boil above 195° C., and preferably those boiling no higher than 250° C., although those boiling up to 300° C. are active to a more limited extent. These cresylic acids are non-discoloring. They are substantially free from phenol and may contain some cresols, a substantial amount of dialkylphenols and also a high percentage of trialkylphenols.

The cresylic acids are converted to monosulfides by reacting with $SCl_2$. The monosulfide obtained by reacting 1 mole of $SCl_2$ with 2 moles of a cresylic acid is preferred, although the reaction product obtained by using up to 1.5 moles of $SCl_2$ is satisfactory.

The petroleum cresylic acids are very different in composition from the coal tar cresylic acids. The latter are not suitable for the purposes of this invention. They contain different isomers from the petroleum cresylic acids, and different ratios of the same isomers.

Oxygen and ozone both have a harmful effect on rubber, but the effect of each is different, and compounds which inhibit or prevent the harmful effect of one are not necessarily effective in stopping the harmful effect of the other.

Crabtree and Kemp in an article in Industrial and Engineering Chemistry, vol. 38, starting at page 278 (1946) explain the difference in the action of oxygen and ozone. The light-catalyzed oxidation which occurs during outdoor exposure forms a skin and crazed appearance over the exposed surface of the rubber. Ozone, even in very low concentration, attacks stretched rubber only (C. H. Leigh-Dugmore, Rubber Age and Synthetics, November and December, 1952), and forms cracks perpendicular to the direction of stretch, and such cracking can occur in the absence of light.

As a matter of fact, practically all commercial rubber antioxidants are without effect in inhibiting deterioration caused by ozone. The cresylic acid monosulfides of this invention do not absorb or act directly on the ozone, but have some unknown action in preventing the cracking which is associated with ozone exposure in stretched natural rubber.

Natural rubber is used in the manufacture of the white-sidewalls of tires. The cracking of such sidewalls has long been a problem. It is often very extensive, and because of the color of the sidewall, it is very noticeable. It is a primary object of this invention to provide antiozone agents which prevent such cracking without discoloring the sidewall. However, the antiozone agents of this invention are not limited to that use but may be employed in black sidewalls, treads, thread and other latex products, and other rubber products.

Tires are stressed when inflated. While a tire is at rest it is stretched statically, and on a moving vehicle it is stretched dynamically, and this is particularly true of the sidewalls. Some of the antiozone agents are more effective in static tests and others are more effective in dynamic tests. Antiozone agents effective under both conditions will be desired for tires, but for other rubber products an antiozone agent which does not meet both tests may be used.

The inhibiting effect of the cresylic acid sulfides of this invention was determined by treatment of rubber compositions with air of controlled low ozone content in specially designed equipment and also by outdoor exposture to natural weathering. The tests were conducted with one-half inch dumbbell samples of approximately 100 gauge thickness. The special apparatus and method of testing are described in the articles by Ford and Cooper, appearing in India Rubber World for September and October, 1951, entitled "A Study of the Factors Affecting the Weathering of Rubber-Like Materials—I and II." In the following reports the ozone concentration maintained during each test is given in parts per 100,000,000 parts of air. The length of exposure to this ozone and the temperature used are also given. Two types of tests were conducted. In one type, called the dynamic test, the sample was repeatedly stretched between the limits of 0 and 20 percent elongation at the rate of 108 cycles per minute. In the other type of test, the static test, the samples were stretched at 12.5 percent elongation throughout the exposure. No special lights were used. On completion of each test the size of the cracks in each sample was compared visually with the size of the cracks in a blank which contained no antiozone agent and which was cured and tested at the same time as the test sample. An arbitrary scale of measuring the results was adopted using the numerals 0, 1, 2, 3, 4 and 5 to represent no visual cracking and cracks which were very fine, fine, medium, coarse and very coarse, respectively.

The reported results include data on the tensile properties of the cured rubber stocks. The modulus and tensile strength are given in pounds per square inch and the elongation is reported as percent of stretch at the break. These properties are reported for cured unaged vulcanizate as well as for vulcanizate which was aged two days in an oven at 212° F.

The antiozone agents were tested in white stock such as might be used in the white sidewalls for tires. The blanks of the white stock were compounded according to the following formula:

|  | Parts by weight |
|---|---|
| Natural rubber | 100 |
| White pigment and filler | 90.2 |
| Stearic acid | 1.2 |
| Sulfur | 3.0 |
| Accelerator | 0.9 |
| Total | 195.3 |

All blanks and test samples of white stock were cured for 60 minutes at 280° F.

In all of the tests 2.0 parts by weight of the antiozone agent was added for each 100 parts by weight of the rubber present in the blank. This is indicated in the following tables. Any substantial small amount of the cresylic acid sulfide may be employed, and this may vary, for example, from 0.2 part by weight to 10 parts by weight, depending upon the use to be made of the rubber composition.

Specifications are given for several petroleum cresylic acids, illustrative of those that may be employed. The specifications are each followed by instructions for preparing the sulfides used in the tests described below. Two sulfides were prepared from each of the first three acids, one using a slight excess over the ratio of 2 parts acid to 1 part $SCl_2$, and the other using 50 percent excess sulfur chloride, or a ratio of 2 parts acid to 1.5 parts $SCl_2$.

*Petroleum cresylic acid monosulfide No. 1A*

This petroleum cresylic acid has a boiling range of 193 to 226° C.

*Preparation of sulfide.*—A monosulfide was prepared from 24.4 g. of the cresylic acid in 100 ml. n-hexane plus 50 ml. ethylene dichloride, and 10.8 g. $SCl_2$. This yielded 26.1 g. of a clear, black, viscous liquid.

*Petroleum cresylic acid monosulfide No. 1B*

The petroleum cresylic acid monosulfide of higher sulfur content was prepared by the reaction of 24.4 g. of the foregoing petroleum cresylic acid dissolved in 100 ml. n-hexane and 50 ml. ethylene dichloride, with 15.5 g. $SCl_2$. This gave 28 g. of black, viscous, tacky solid.

*Petroleum cresylic acid monosulfide No. 2A*

This petroleum cresylic acid has a boiling range of 248 to 300+° C. The supplier gives these further specifications:

| | |
|---|---|
| Specific gravity at 60° F. | 1.020 |
| Sulfur, percent by weight | 0.16 |
| Distillation, ° C.: | |
| I. B. P. | 248 |
| 5% | 251 |
| 50% | 262 |
| 95% | 297 |
| E. P. | 300+ |
| Neutral oil, percent by volume | 0.4 maximum |
| Solid matter | None |
| $C_4$ alkyl phenols, percent by weight, the balance being principally higher alkyl phenols | 75–80 |

*Preparation of sulfide.*—A monosulfide was prepared by allowing 30.0 g. (0.2 mole) of the cresylic acid to react with 10.8 (0.105 mole) $SCl_2$ in 100 ml. of n-hexane and 50 ml. of ethylene dichloride. Thirty one and a half grams of a black, sticky resin was obtained.

*Petroleum cresylic acid monosulfide No. 2B*

The preparation of this monosulfide was identical with the foregoing except that 15.5 g. (0.15 mole) $SCl_2$ was employed. The yield was 33.5 g. of a black resin.

*Petroleum cresylic acid monosulfide No. 3A*

This petroleum cresylic acid has a boiling range of 221 to 245° C. The supplier gives these further specifications:

| | |
|---|---|
| Specific gravity at 60° F. | 1.013 |
| Sulfur, percent by weight | 0.08 |
| Distillation, ° C.: | |
| I. B. P. | 221 |
| 5% | 223 |
| 50% | 227 |
| 95% | 241 |
| E. P. | 245 |
| Neutral oil, percent by volume | 0.4 maximum |
| Solid matter | None |
| Xylenols, percent by weight | 8–10 |
| $C_3$ alkylphenols, percent by weight | 45–55 |
| $C_4$ alkyl phenols, percent by weight | 30–40 |

*Preparation of sulfide.*—A solution of 27.2 g. of cresylic acid in 200 ml. of n-hexane and 100 ml. of ethylene dichloride was prepared and 10.8 g. of sulfur dichloride was added at 25 to 30° C. over a half-hour period. Removal of the solvent gave 29.0 grams of a viscous brown liquid.

*Petroleum cresylic acid monosulfide No. 3B*

Twenty-seven and two tenths grams (0.2 mole) of the foregoing cresylic acid in 100 ml. n-hexane and 50 ml. ethylene dichloride were allowed to react with 15.5 g. (0.105 mole) $SCl_2$. This yielded 32.8 g. of brown, sticky resin.

*Petroleum cresylic acid monosulfide No. 4*

This petroleum cresylic acid had a boiling range of 217 to 240° C.

*Preparation of sulfide.*—Twenty-seven and two tenths grams (0.2 mole) of the cresylic acid was dissolved in 100 ml. n-hexane and 50 ml. ethylene dichloride and allowed to react with 10.8 g. (0.105 mole) $SCl_2$. The yield was 28.5 g. of brown viscous liquid.

*Petroleum cresylic acid monosulfide No. 5*

This petroleum cresylic acid has a boiling range of 246 to 271° C.

*Preparation of sulfide.*—A solution of 30.0 g. (0.2 mole) of the cresylic acid in 100 ml. n-hexane and 50 ml. ethylene dichloride was allowed to react with 10.8 g. (0.105 mole) $SCl_2$. This yielded 33.8 g. black, very viscous liquid.

*Petroleum cresylic acid monosulfide No. 6*

This petroleum cresylic acid has a boiling range of 200 to 228° C. The supplier gives these further specifications:

| | |
|---|---|
| Specific gravity at 100° F | 1.032 |
| Sulfur, percent by weight | 0.37 |
| Distillation, ° C.: | |
| I. B. P. | 200 |
| 5% | 203 |
| 50% | 207 |
| 95% | 220 |
| F. B. P. | 228 |
| Neutral oil, percent by weight | 0.4 |
| Mercaptan sulfur, percent by weight | 0.27 |
| Phenol constituents, percent by weight: | |
| Phenol | 1 |
| o-Cresol | 9–11 |
| m-Cresol | 4–5 |
| p-Cresol | 4–5 |
| Xylenols | 25–35 |
| $C_3$ alkyl phenols | 38–42 |
| $C_4$ alkyl phenols | 0 |

*Preparation of sulfide.*—The monosulfide was prepared by the reaction of 10.8 g. (0.105 mole) $SCl_2$ with a solution of 24.4 g. of the cresylic acid in 100 ml. n-hexane and 50 ml. ethylene dichloride.

Tables 1 and 2 show the results of tests conducted with certain of the foregoing cresylic acid monosulfides in white stock. Tables 3, 4 and 5 record the results of further tests in white stocks, comparing monosulfides of different sulfur contents derived from the same cresylic acids, as aforesaid.

TABLE 1—WHITE STOCK

| | | | |
|---|---|---|---|
| Blank | 195.3 | 195.3 | 195.3 |
| Cresylic acid monosulfide No. 4 | | 2.0 | |
| Cresylic acid monosulfide No. 5 | | | 2.0 |
| Normal tensile properties: | | | |
| 400% modulus | 975 | 925 | 1,050 |
| Tensile strength | 3,700 | 3,550 | 3,625 |
| Elongation at break | 625 | 620 | 595 |
| Aged 2 days in oven at 212° F.: | | | |
| 400% modulus | 625 | 950 | |
| Tensile strength | 1,725 | 2,250 | 2,025 |
| Elongation at break | 560 | 540 | 510 |
| Ozone effects (7 hrs. at 60 p. p. h. m. and 95° F.): | | | |
| Static | 4+ | 1 | 22 |
| Dynamic | 4 | 1 | |

TABLE 2—WHITE STOCK

| | | | |
|---|---|---|---|
| Blank | 195.3 | 195.3 | 195.3 |
| Cresylic acid monosulfide No. 3A | | 2.0 | |
| Cresylic acid monosulfide No. 1A | | | 2.0 |
| Normal tensile properties: | | | |
| 400% modulus | 925 | 875 | 900 |
| Tensile strength | 3,400 | 3,425 | 3,525 |
| Elongation at break | 610 | 610 | 615 |
| Aged 2 days in oven at 212° F.: | | | |
| 400% modulus | 875 | 975 | 900 |
| Tensile strength | 2,325 | 2,300 | 2,125 |
| Elongation at break | 545 | 545 | 540 |
| Ozone effects (7 hrs. at 60 p. p. h. m. and 95° F.): | | | |
| Static | 4 | 2 | 1+ |
| Dynamic | 4+ | 2− | 1+ |
| Ozone effects (4 hrs. at 45 p. p. h. m. and 95° F.): | | | |
| Static | 3− | 1 | 1− |
| Dynamic | 3− | 1 | 1− |

TABLE 3—WHITE STOCK

| | | | |
|---|---|---|---|
| Blank | 195.3 | 195.3 | 195.3 |
| Cresylic acid monosulfide No. 1A | | 2.0 | |
| Cresylic acid monosulfide No. 1B | | | 2.0 |
| Normal tensile properties: | | | |
| 400% modulus | 875 | 900 | 850 |
| Tensile strength | 3,275 | 3,425 | 3,425 |
| Elongation at break | 610 | 610 | 630 |
| Aged 2 days in oven at 212° F.: | | | |
| 400% modulus | 1,025 | 1,000 | 975 |
| Tensile strength | 2,625 | 2,275 | 2,175 |
| Elongation at break | 530 | 525 | 530 |
| Ozone effects (7 hrs. at 60 p. p. h. m. and 95° F.): | | | |
| Static | 4− | 1 | 1+ |
| Dynamic | 4− | 1− | 1 |

TABLE 4—WHITE STOCK

| | | | |
|---|---|---|---|
| Blank | 195.3 | 195.3 | 195.3 |
| Cresylic acid monosulfide No. 2A | | 2.0 | |
| Cresylic acid monosulfide No. 2B | | | 2.0 |
| Normal tensile properties: | | | |
| 400% modulus | 900 | 900 | 925 |
| Tensile strength | 3,725 | 3,425 | 3,450 |
| Elongation at break | 660 | 615 | 620 |
| Aged 2 days in oven at 212° F.: | | | |
| 400% modulus | 750 | 925 | 950 |
| Tensile strength | 1,375 | 1,900 | 1,800 |
| Elongation at break | 495 | 505 | 495 |
| Ozone effects (7 hrs. at 60 p. p. h. m. and 95° F.): | | | |
| Static | 4 | 2− | 2 |
| Dynamic | 4 | 2− | 2+ |

TABLE 5—WHITE STOCK

| | | | |
|---|---|---|---|
| Blank | 195.3 | 195.3 | 195.3 |
| Cresylic acid monosulfide No. 3A | | 2.0 | |
| Cresylic acid monosulfide No. 3B | | | 2.0 |
| Normal tensile properties: | | | |
| 400% modulus | 1,000 | 1,075 | 1,025 |
| Tensile strength | 3,625 | 3,315 | 3,515 |
| Elongation at break | 625 | 590 | 610 |
| Aged 2 days in oven at 212° F.: | | | |
| 400% modulus | 825 | 1,075 | 1,025 |
| Tensile strength | 2,025 | 2,400 | 2,250 |
| Elongation at break | 540 | 540 | 540 |
| Ozone effects (7 hrs. at 60 p. p. h. m. and 95° F.): | | | |
| Static | 4 | 0+ | 1− |
| Dynamic | 4− | 1− | 1− |

The following table records the results of exposing white stocks to natural weathering.

TABLE 6—EVALUATION OF WHITE STOCKS AFTER OUTDOOR EXPOSURE

| | After 28 days | | |
|---|---|---|---|
| | Front | Back | Edge |
| Blank | 4 | 1+ | 4+ |
| Cresylic acid monosulfide No. 3A | 2+ | 1− | 3− |
| Cresylic acid monosulfide No. 3B | 3− | 1+ | 4− |

The recorded results are illustrative. They show that the cresylic acid monosulfides of this invention prevent or inhibit the deterioration caused by ozone. They may be used in rubber compositions compounded for use in rubber thread and in other rubber stocks.

By sulfur vulcanization is meant the curing of rubber by reaction with either free sulfur or a vulcanizing agent of the sulfur-donor type. Known agents of the latter type include the various phenol polysulfides including the alkyl derivatives thereof, the zanthogen polysulfides, the thiuram disulfides and polysulfides, various amine sulfides including dialkylamine polysulfides and reaction products of primary amines with excess sulfur. Known vulcanization accelerators are useful in speeding up the vulcanization process and are operative herein, especially the relatively active accelerators including the thiazole sulfenamides, e. g. N-cyclohexyl-2-benzothiazolesulfenamide, thiazoline sulfenamides, thiocarbamyl sulfenamides, mercaptothiazoles, mercaptothiazolines, thiazoyl mono- and di-sulfides, the N,N-dialkyl-dithiocarbamates, the thiuram sulfides, the xanthogen sulfides, metallic salts of mercaptothiazoles or mercaptothiazolines or dithiocarbamic acids. One or more accelerator activator is often used with any of the accelerators mentioned, and such activators include the various derivatives of guanidine known in the rubber art, amine salts of inorganic and organic acids, various amines themselves, alkaline salts such as sodium acetate and the like, as well as other activators known to the art. Additionally, two or more accelerators or accelerator combinations are sometimes desirable in a single rubber compound. Many of the accelerators mentioned above are suitable in latex formulations, especially such common accelerators as piperidinium pentamethylene-dithiocarbamate, zinc butylxanthate, zinc ethylxanthate, zinc salt of mercaptobenzothiazole, zinc dimethyldithiocarbamate, and zinc dibutyldithiocarbamate. Although vulcanization is usually accomplished by heating a vulcanizable rubber composition at a temperature in the range of 240 to 400° F. for a time ranging from several hours to a few seconds, vulcanization does take place at lower temperatures such as ordinary room temperature. It is quite common to vulcanize a latex film containing an ultra accelerator by allowing the film to remain at room temperature for several hours or a few days.

What is claimed is:

1. A white, shaped, sulfur-vulcanized composition of natural rubber which is adapted to be stretched dynamically, contains sufficient white pigment to make the composition white and contains as a non-discoloring antiozone agent, a small amount of monosulfide of a cresylic acid of petroleum origin which (1) is substantially free from phenol and (2) contains monoalkylphenols, dialkylphenols and trialkylphenols and (3) boils above 195° C. and no higher than 250° C.

2. A white, shaped, sulfur-vulcanized composition of natural rubber which is adapted to be stretched dynamically, contains sufficient white pigment to make the composition white and contains as a non-discoloring antiozone agent, a small amount of monosulfide of a cresylic acid of petroleum origin which is composed largely of alkyl phenols containing a total of no less than three carbon atoms in the alkyl substitutents, the cresylic acid boiling between 195° C. and 250° C.

References Cited in the file of this patent

UNITED STATES PATENTS

| | | |
|---|---|---|
| 1,849,489 | Howland | Mar. 15, 1932 |
| 2,175,082 | Hagen et al. | Oct. 3, 1939 |
| 2,495,145 | Smith, Jr., et al. | Jan. 17, 1950 |
| 2,626,932 | Smith, Jr. | Jan. 27, 1953 |
| 2,700,691 | Mayes | Jan. 25, 1955 |
| 2,726,277 | Downey | Dec. 6, 1955 |

OTHER REFERENCES

Cook et al., Ind. and Chem., vol. 40, No. 7, pp. 1194–1202, July 1948.

UNITED STATES PATENT OFFICE
CERTIFICATE OF CORRECTION

Patent No. 2,849,516            August 26, 1958

Harry E. Albert et al

It is hereby certified that error appears in the printed specification of the above numbered patent requiring correction and that the said Letters Patent should read as corrected below.

Column 2, lines 13 and 14, for "exposture" read — exposure —; column 4, Table 1, last column thereof, for that portion of the column reading:

| 2,025 | | 2,025 |
| 510 | | 510 |
| | read | |
| 22 | | 2- |
| | | 2 |

Signed and sealed this 26th day of April 1960.

(SEAL)
Attest:

KARL H. AXLINE            ROBERT C. WATSON
Attesting Officer            Commissioner of Patents